RECORDING SYSTEM

Filed Dec. 31, 1948 3 Sheets-Sheet 1

INVENTOR
R. K. POTTER
BY G. H. Heydt
ATTORNEY

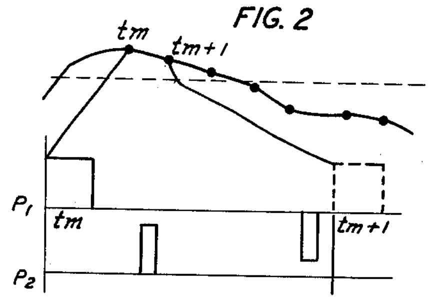
FIG. 3
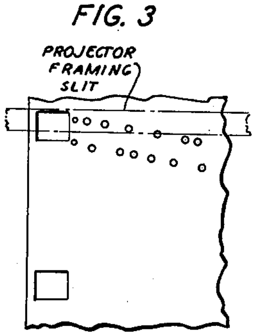
FIG. 4
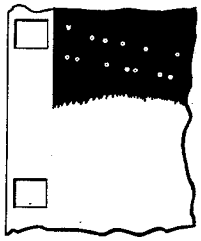
FIG. 6
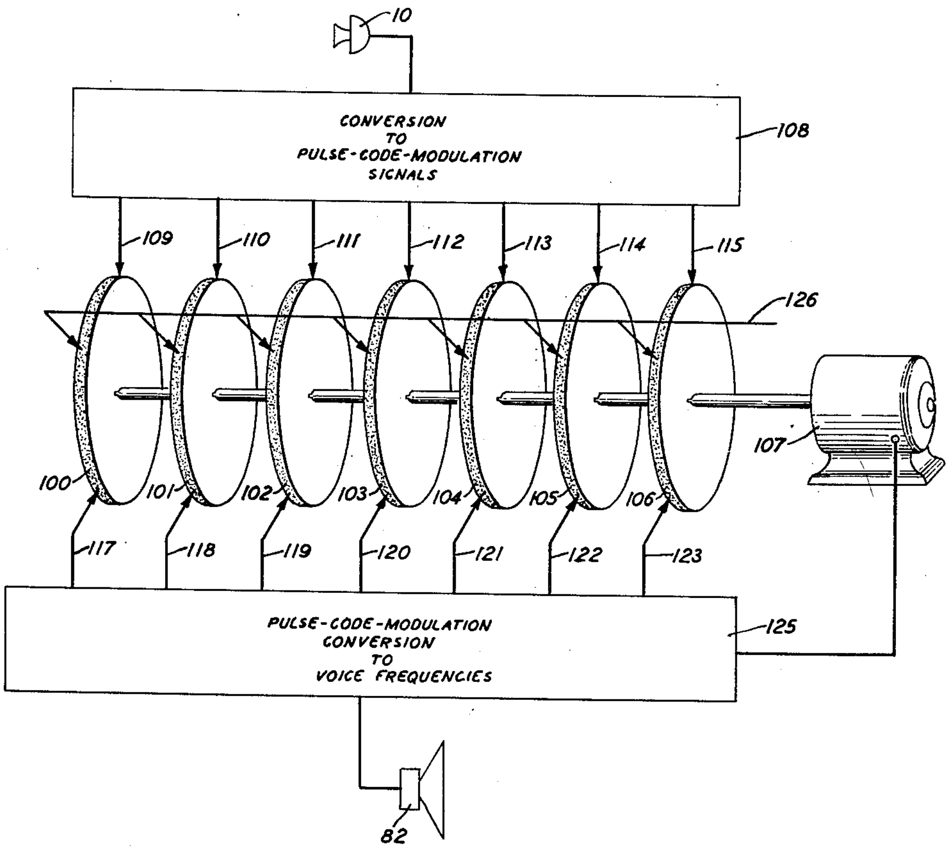
INVENTOR
R. K. POTTER
BY G. H. Heydt
ATTORNEY INVENTOR
R. K. POTTER
BY
G. H. Heydt
ATTORNEY Patented May 6, 1952

2,595,701

UNITED STATES PATENT OFFICE 2,595,701

RECORDING SYSTEM

Ralph K. Potter, Madison, N. J., assignor to Bell Telephone Laboratories, Incorporated, New York, N. Y., a corporation of New York Application December 31, 1948, Serial No. 68,601

15 Claims. (Cl. 179—100.3)

This invention relates to a system and methods for recording and reproducing complex sound waves.

An object of the invention is to obtain a system competent to record and reproduce, with high fidelity, a complex sound wave, and in such a manner that the signal-to-noise ratio of the reproduced sound wave is improved materially.

A primary object is to obtain a sound record that is free of extraneous noises which are caused by irregularities in the recording medium.

A further object is to recombine a succession of signal pulses to obtain a reconstructed sound wave of substantially the same form as an original sound wave.

Due to recent improvements in radio broadcasting techniques a necessity exists for improved systems and methods of recording and reproducing aural program material. This necessity is magnified by the increased use of program material which is recorded in advance of the actual broadcast.

A major problem in the reproduction of recorded programs is caused by the involuntary recording of extraneous noises. This problem is an actuality on account of the limitations of known recording and reproducing mediums. For example, when the photographic method is utilized to record a program, certain irregularities of film structure will originate unwanted noises, and other noises may be initiated by the presence of dirt particles on the record. These noises are recorded together with legitimate signals, and when reproduced will cause a distortion of the sound waves, and an attendant loss of reproduction fidelity.

Any system which tends to mitigate program reproduction noises is desirable. Numerous systems for reducing extraneous noises are in existence, but the efficiency of all known noise reduction systems appears to be circumscribed by limitations in the particular recording medium that is utilized.

The system in accordance with the invention eliminates recording noises due to lack of homogeneity in the physical structure of the recording medium, and limits reproduction noises to the noise characteristics of the reproducing medium.

In systems utilizing what is commonly known as "PCM" or pulse code modulation transmission, a speech wave, or other signal to be transmitted, is sampled periodically in order to obtain an instantaneous amplitude of the wave or signal. The measured instantaneous amplitude is typified by pulse codes which are analogous to telegraph codes.

In accordance with the invention, equipment is provided for generating a group of control pulses in predetermined time relationship to each other. The pulse generator also controls sampling equipment which samples a given complex wave. A code element timing circuit generates a cycle of code element timing pulses for each of the control pulses. The control and timing pulses in combination test the polarity of the sample, and compare its amplitude, under different conditions, with known voltage values. A series of code pulses is originated and transmitted and these code pulses correspond to and are characteristic of, the polarity and amplitude information obtained by instant samplings of the input wave. The samples taken are not transmitted in the form they are taken, but instead, the amplitude of each sample is converted into a rapid sequence of pulses that forms a code symbol for the amplitude. The number of different values of the sample that may be transmitted in such a system depends on the number, $n$, of pulse positions in the particular code utilized. When simple on-or-off pulses are used, like a teletypewriter code, the number is $2n$. Where $n=5$, there are 25 or 32 possible codes and thus 32 different values of the sample may be transmitted. If a seven-position code is used, 128 values of the sample may be sent.

It would be possible, of course, to use fewer pulses to represent a given number of signal values if each pulse could have any of several values. The number of pulses required to represent each value of the signal would then be $k^n$, where $n$ as before, is the number of pulses, and $k$ is the number of different values that each pulse may have. Carrying this to the limit, 128 values of the sample could be transmitted by one pulse having 128 different possible magnitudes. When a single pulse is used to represent the magnitude of the sample, the frequency band could theoretically be the same as used for a frequency division multiplex system of the same number of channels. If more than one pulse is used per sample, however, the frequency band must be widened. In the system in accordance with the invention any suitable pulse code modulation system may be utilized.

The pulse codes are fed to an electron distributor and modulate the instant intensity of an electron beam within the distributor in accordance with the code. The electron beam is swept over a series of grids each one of which is connected to a small microflash lamp. The number of microflash lamps may vary in accordance with the type of code transmitted. For example, a series of ninety-six microflash lights could represent twelve successive groups of an eight-unit code. These lights flash under control of the system and if the lamps are arranged in a straight row, serve to distribute the PCM signals in space, along the row of flash lamps. A camera is utilized to complete a photographic film record of the light flashes and the speed of the camera film drive is synchronized with the operation speed of the code pulse transmission equipment.

The completed photographic film record can be of a positive or negative type, and show the pulse code modulation signals as a series of white or black dots upon the surface of the film.

When it is desired to reproduce the original complex wave, the procedure utilized is, to a certain extent, a reversal of the recording procedure. The film is placed in a projector which projects the code pulses from the film upon a series of photoelectric cells. Each cell is connected to an electron distributor and the projection of the code pulses upon the bank of cells originates pulse code modulation signals. A control pulse generator and associated apparatus are provided, and each group of pulses is utilized to produce a pulse which has a magnitude that is proportional to the instant magnitude of the corresponding samples of the original complex wave. A representation of the original complex wave is reconstructed, from a succession of the reproduced pulses of varying magnitudes, and the representation of the original wave is used to actuate a speaker and reproduce with high fidelity the original sound.

The use of code symbols permits the reproduction of speech, music, or any wave form without acquiring any noise or distortion from the recording medium, provided the pulses in the code symbols are not so disturbed as to be interpreted as having an amplitude different from the discrete one intended. A simple "on-or-off" type system achieves the greatest tolerance to distortion since the magnitude of the pulses is not critical and only the presence or absence of a pulse need be distinguished. It is advisable that recording and reproducing systems have a frequency response commensurate with the original sound, and this response range should be between 50 to 8,000 cycles.

In the system in accordance with the invention the signal pulses may be regenerated at any time before they are recorded and given a fresh start free of the noise and distortion previously encountered. Again, the signal pulses originated by the reproducing system may be regenerated and also freed from noise and distortion. Thus the code pulses ultimately energize the reproducing equipment so as to faithfully reproduce the sound originated at the recording equipment.

The recording-reproduction speeds may be controlled by a high quality magnetic-tape delay equipment which can be used with the invention. The recording film may be operated at a standard film velocity of ninety feet per minute.

The system to be described herein is also suitable for use with pulse code modulation systems of the "vernier" type, that shown in Fig. 2 of E. Peterson, United States Patent 2,516,587 issued July 25, 1950, being suitable for this purpose.

Referring to the drawings:

Fig. 2 is a graphic representation of the operation of a pulse code modulation system used in the recording equipment of Fig. 1;

Fig. 3 is a schematic drawing and shows a negative film record made in accordance with the invention and a projection slit imposed upon the record;

Fig. 4 is a schematic drawing and shows a positive film record made in accordance with the invention;

Fig. 6 is a schematic drawing of a recording delay equipment which can be utilized in conjunction with the embodiment of Figs. 1 and 5.

Figure 1:
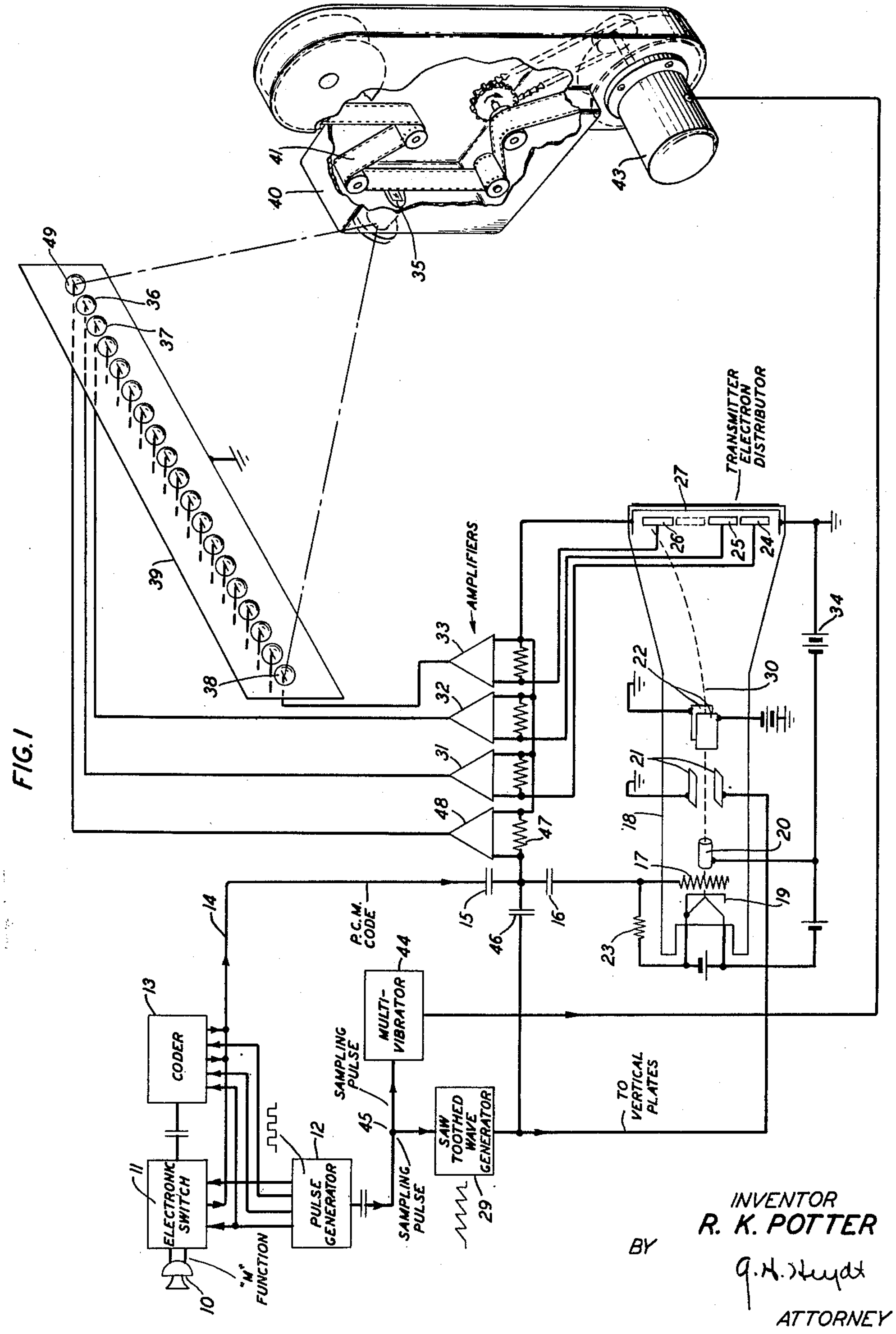
Fig. 1 is a schematic drawing, and shows an embodiment of the recording equipment in accordance with the invention.

Referring to Fig. 1, there are shown circuits and apparatus for recording speech waves by translating them into pulse code modulation signals, and then establishing symbols representative of these signals upon a photographic film.

Speech waves, or any other sounds to be recorded, are introduced into a microphone 10. From the microphone 10 an electrical signal wave representative of the sound wave is led into an electronic switch 11. A series of pulse code modulation signals is then generated by sampling the electrical wave by any suitable method known to the art.

In pulse code modulation systems the sampling and generating equipment usually comprises the electronic switch 11, a pulse generator 12 and a coder 13. A circuit suitable for use in this invention is shown and described in United States Patent 2,437,707, issued March 16, 1948, to J. R. Pierce, and the devices 10 to 13 enumerated above are similar to those disclosed in Fig. 1 of that patent.

When pulse code modulation systems are utilized, the sampling should be completed at a rate of at least twice that of the top frequency to be recorded. For example, if the top frequency of a given wave were 8,000 kilocycles, the wave should be sampled 16,000 times per second.

If it is desired, for example, to record twelve groups of an eight-digit code, each signal symbol would be spaced approximately 10 mils apart upon the record film, and there would be substantially 12 mils spacing between each row of signal symbols.

A lead 14 from the coder 13 contains the requisite pulse code modulation signals which comprise a series of "on-off" type pulses in time sequence. These signals are led from the coder 13 through blocking condensers 15 and 16 to a control grid 17 of an electron distributor 18. The blocking condensers 15 and 16 are inserted in the circuit so that operating potentials of the electron tube 18 may be fixed readily at their customary operating potentials. A customary grid leak comprising a resistance 23 is used to discharge the condenser 16. The distributor 18 includes an electron emitter 19, a control grid 17, an electron focusing electrode 20, vertical deflection plates 21 and horizontal deflection plates 22. Also contained within the electron distributor 18 are a representative plurality of contact anodes 24, 25, and 26, and a guard plate 27. The vertical deflecting plates 21 are energized by a linear sweep wave from a conventional saw-toothed wave generator 29, and sweep an electron beam 30 over the contact anodes 24 to 26. The amplitude of this sweep and the sensitivity of the electron distributor 18 can be related, so that the time required to sweep the beam 30 from one contact anode to an adjacent contact anode is equal to the time period between successive pulses of the pulse code. The operation of the generator 29 is controlled by a fundamental frequency derived from the pulse generator 12. The code pulse signals impressed upon the control grid 17 modulate the intensity of the beam 30 from a zero to maximum value. The horizontal deflection plates 22 are used when required for accurate centering of the beam 30.

The electron distributor 18 can be of any suitable type known to the art. A suitable distributor is shown in Fig. 4 of United States Patent 2,185,693, issued January 2, 1940, to P. Mertz.

The anodes 24, 25 and 26 are shown connected to input terminals of amplifiers 31, 32 and 33. The other input terminals of these amplifiers are connected in common to the guard plate 27 and to the positive terminal of an anode battery 34. The guard plate 27 prevents electrons which miss contacting the anodes 24 to 26 from accumulating within the tube 18 and forming a space charge. The outputs from the amplifiers 31, 32 and 33 are led to microflash lamps 36, 37 and 38 which are individual members of a microflash lamp plurality contained within a lamp battery 39.

The pulse code modulation signals reaching the control grid 17 have one of two values, "off" or "on," and modulate the intensity of the electron beam 30 from a zero to maximum value as stated above. Electrons reaching the anodes 24 to 26 are amplified in the vacuum tube amplifiers 31 and 33 to obtain a resultant maximum output corresponding to the "on" pulse code modulation signal. The flash lamp associated with a particular contact anode is actuated at this instant to its maximum brilliance.

The result obtained from the modulation and sweeping effects on the electron beam 30, is to energize the microflash lamps in the lamp battery 39 in time sequence. The resultant light flashes are focused by an optical system in a camera 40, through a framing slit 35, in a horizontal row along the surface of a recording photographic film 41. Since these light flashes occur in a time sequence, and not as one simultaneous flash from all the lamps in the lamp battery, focused picture images of the flashes appear upon the surface of the film 41, and are recorded thereon in a sloped arrangement across the width of the film as will be explained.

The film drive mechanism of the camera 40 is actuated from a synchronous motor 43. The motor 43 is energized from a conventional step-down multivibrator system 44 which is connected to the pulse generator 12 by a lead 45. The lead 45 supplies a fundamental frequency to the series of step-down multivibrators which reduce the frequency from the generator 12 to a value of approximately 60 cycles, which is suitable for use with the synchronous motor.

To blank out the sweep of the beam 30 on each return trace, a large negative pulse is momentarily impressed upon the control grid 17 of the electron distributor 18. This negative pulse is derived from the return trace of the sweep by means of a differentiating circuit which comprises a capacitor 46 and a resistor 47. The negative potential is large enough to suppress the electron beam 30 so that the microflash tubes used for pulse code modulation signals cannot be energized during the return trace of the beam 30. The negative pulse is also amplified in an amplifier 48, and used to actuate a synchronizing microflash tube 49. The microflash tube 49 is utilized to provide a synchronizing trace on the margin of the recording film 41 for accurate framing purposes when the recorded signals are reproduced as will be explained. There is a synchronizing trace for each row of signal symbols.

To complete the description and understanding of Fig. 1 it may be advisable to refer for an example to an integral multiple of pulse code modulation groups. Thus, if a plurality of ninety-six microflash lamps are utilized in the battery 39, the members of the lamp battery 39 can accommodate twelve successive groups by an eight-digit code. Although in the interest of clarity only three contact anodes 24, 25 and 26, and three amplifiers 31, 32 and 33 are shown, it will be understood that there should be a contact anode in the electron distributor 18, and an associated amplifier, for each member of the particular plurality of microflash lamps utilized as shown in Fig. 1.

Referring to Fig. 2 which is similar to Fig. 3 of the Pierce patent referred to above, there are shown sound wave forms which are sampled at suitable time intervals, such as one-eighth thousandth of a second, as indicated by symbols $t_m$ and $t_m+1$. $P_1$ shows a broad sampling pulse, while $P_2$ is a schematic representation of pulses as applied to the coder 13 of Fig. 1, to initiate sampling information for transmission. A negative pulse is used to reset the equipment, as has been explained in relation to Fig. 1. The time intervals between any adjacent pair of pulses are identical.

Referring to Fig. 3 there is shown part of a negative film record made in accordance with the invention. A series of light flash images are shown sloped across the width of the recording film. This oblique placement of the images results from the continual advance movement of the film. A framing slit is shown imposed upon the record film. The purpose of the framing slit will be explained when discussing the reproducing equipment of Fig. 5.

Referring to Fig. 4 there is shown part of a positive film record made in accordance with the invention and similar to the negative film record of Fig. 3.

Reproduction of the recorded pulse code modulation communication from the film record proceeds in a manner analogous to that described for the recording process.

Figure 5:
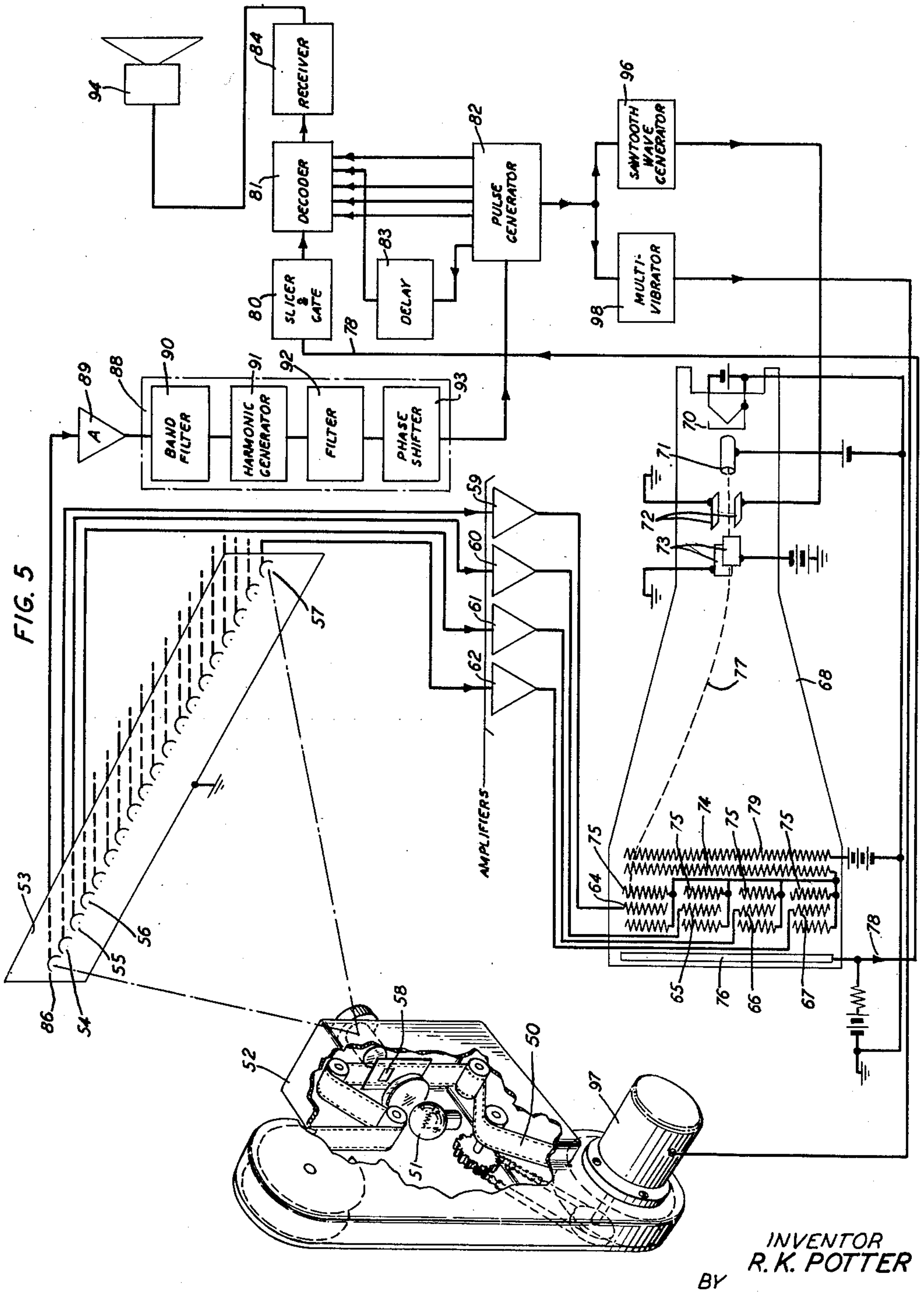
Fig. 5 is a schematic drawing, and shows an embodiment of a reproducing equipment in accordance with the invention.

Referring to Fig. 5 which is a schematic drawing, there is shown an embodiment of a reproducing equipment in accordance with the invention.

A film 50 containing the recorded codes is illuminated by a light source 51 contained within a projector 52. Signal images of the recorded pulses situated on the film surface across the film width are focused by the projector optical unit through a framing slit 58 upon members of a horizontal plurality of photocells contained in a photocell battery 53. These projected signal images are focused upon the photocells in such a manner that there is no appreciable overlap of the signal images. Since the record film is driven continuously, the image of each recorded signal pulse is moved in its turn and projected upon a corresponding photoelectric cell of the battery 53.

The framing slit 58 is shown enlarged in Fig. 5 for purposes of clarity, but actually is a narrow slit that has a proportional relationship to the rows of signal symbols as shown in Fig. 3. The framing slit 58 permits only parts of one signal symbol row to be projected at a given instant. It is immaterial if more than one signal symbol is illuminated at the same instant for a control beam of electrons is in electrical connection with but one photocell at the same instant, as will be explained below.

The outputs from photocells 54, 55, 56 and 57 are amplified in the amplifiers 59, 60, 61 and 62. The outputs from these amplifiers are led to control grids 64, 65, 66 and 67 of a switching tube 68. The switching tube 68 may be of any suitable type such as that shown in Fig. 2 of the Mertz patent referred to above. The switching tube 68 contains the control grids 64, 65, 66 and 67, a cathode 70, accelerator tube 71, vertical deflecting plates 72, horizontal deflecting plate 73, retarding grid 74, acceleration grid 79, shield screens 75 and an anode 76. An electron beam 77 is swept past the control grids 64, 65, 66 and 67 and the beam 77 is modulated in accordance with the instant potential on each individual control grid. The control grid potential is dependent upon whether the original recorded code pulse was of an "on" or "off" type. Electron pulses reach the anode plate 76 and are fed from this plate through a lead 78 to a slicer and gate circuit 80 and thence to a pulse code modulation decoder 81. The slicer and gate circuit 80 in effect takes a horizontal slice in amplitude and a vertical slice in time of each pulse so as to regenerate effectively the signal pulses. The slice and gate circuit 80 may be of any suitable conventional type.

The decoder 81 is part of a pulse decoding system comprising a pulse generator 82, delay equipment 83, and a receiver 84. Any suitable system may be utilized, and the system as shown in Fig. 5 is similar to that disclosed in Figs. 2 and 6 of the Pierce patent referred to above, with the exception of two minor modifications of the patent circuit. The first modification is the removal for the present purpose of the Pierce detector. The second modification is that the fundamental frequency to control the operation of the pulse generator 82 is herein derived from a synchronizing spot which occurs at each signal row on the recording film as was explained in relation to Fig. 1.

The action of decoder 81 is synchronized to the recording speed by a series synchronizing spots on the record film 50. A synchronizing spot appears on the film record at the beginning of each row of signals. In a twelve-group, eight-digit code system, one synchronizing pulse appears for every twelve groups and the frequency of occurrence of the synchronizing spot must be two-third kilocycles. The synchronizing spot energizes a photoelectric cell 86 of the cell battery 53. The output from cell 86 is amplified in an amplifier 89 and thence is led through a fundamental frequency derivation circuit 88. In this circuit the synchronizing output is first fed to a band filter 90 to select the necessary component frequency. When the filter band width is made narrow enough to exclude harmonics of the signal as well as incidental noise, the output of the band filter 90 is substantially sinusoidal.

A twelfth harmonic is then produced in the synchronizing signal output by a harmonic generator 91 which may be of any suitable conventional type, such as those utilizing a biased vacuum tube, or a saturable core coil for the nonlinear element. The output from the harmonic generator 91 is led to a filter 92. The filter 92 has a band narrow enough to exclude all harmonics but the desired one, so that its output is substantially any desired value, for example pure 8 kilocycles.

After filtering, the phase of the 8-kilocycle resultant output signal is adjusted in a phase shifter 93 to compensate for any phase shifts introduced by the apparatus. The phase shifter 93 may be of any simple type such as those phase shifters which utilize a condenser and resistor circuit.

From the phase shifter 93 the synchronizing signal originated by the synchronizing trace upon the film 50 is led to the pulse generator 82 and is used as the fundamental control source frequency for all decoding and speed control operations.

The fundamental derivation circuit 88 comprising the units 90 to 93 corresponds to tube 610 of Fig. 6 of the Pierce patent referred to above.

With the decoder 81 synchronized to obtain correct framing of the film 50 in the framing slit 58 in the projector 52, the pulse code modulation signals which reach the decoder 81 via the lead 78, and slicer and gate circuit 80, are reconverted to speech amplitude in a manner familiar to those skilled in the art, and when processed in the receiver 84 are used to actuate a loudspeaker 94.

The sweep wave for the switching tube 68 is obtained from a saw-tooth generator 96 which is energized by the fundamental from the pulse generator 82. The output of the saw-tooth generator 96 deflects the electron beam 77 across the control grids 64, 65, 66 and 67 by energization of the vertical deflector plates 72. The saw-tooth generator 96 may be of any suitable conventional type, such as a condenser charged by a constant current source.

The film drive mechanism of the projector 52 is actuated by a synchronous motor 97 which is energized by a step-down series of conventional type multivibrators 98. The multivibrator series 98 reduces the fundamental frequency to a frequency close to sixty cycles per second which is suitable for use by the motor 97. Double-stability multivibrators can be utilized, with the output of one stage coupled to the succeeding stage by use of differentiating circuits comprising resistance-capacitance circuits in a well-known manner. The natural period of a multivibrator is made longer than that at which it is normally driven, so that the input pulses control.

In the system according to the invention, the speed of the film drive of the recording unit of Fig. 1 may be of any suitable speed as is determined by the frequency fundamental from the pulse generator 12 which energizes the multivibrator series 44 and controls the operational speed of the film drive motor 43. The speed of the film drive in the reproducing unit of Fig. 5 is synchronized with the recording speed by utilization of the synchronizing spots or signals which appear at the start of each signal row on the record film 50. These spots processed through the fundamental frequency derivation circuit 88, furnish a fundamental to the pulse generator 82 as explained above. Since the step-down multivibrator series 98, and the saw-tooth generator 96 are both fed by a common output from the pulse generator 82, the speed of the scanning beam 77 in the switching tube 68, and the speed of the synchronized motor 97 are related, and both speeds are determined primarily by the fundamental control frequency originated by the synchronizing spots on the record film 50 supplied as a fundamental to the pulse generator 82.

Referring to Fig. 6 there is shown a schematic drawing of a recording delay equipment which can be utilized in conjunction with the embodiments described in relation to Figs. 1 and 5.

A time delay feature can be provided for the pulse code modulation signals. For this purpose a recording is effected magnetically on oxide tape or on other suitable magnetically retentive material which forms the perimeter of the discs 100 to 106 which are mounted upon a rotatable shaft and actuated by a synchronous motor 107. In the schematic drawing of Fig. 6, the equipment embodiment of Fig. 1 from the microphone 10 to and including the microflash lamp battery 39 is represented as contained within the block 108. This recording equipment in block 108 is used to actuate members 109 to 115 of a magnetic recording head plurality. These members 109 to 115 record the code signals on a particular corresponding member of the disc plurality 100 to 106.

Also in contact with the discs 100 to 106 are a series of pick-up heads 117 to 123, to obtain the pulse code modulation code signals from the tapes on discs 100 to 106, and transmit them to reproducing equipment contained within the block 125.

The equipment represented as contained within the block 125 comprises the equipment embodiment of Fig. 5 included between the speaker 94 and the photoelectric cell battery 53. On each recording track between the recording heads 109 to 115, and the pick-up heads 117 to 123, are located a series of erasing heads 126 to efface any remaining traces from a preceding code signal wave. The time period required for the magnetic material to pass between the recording and reproducing heads is made substantially equal on all recording heads.

While but seven recording discs are shown in Fig. 6 it will be understood that the number will vary in accordance with the particular digit group system utilized. In the single-channel system illustrated in the drawings, there would be a disc for each digit pulse of the code group.

It is to be understood that the above-described embodiments are illustrative examples and that various modifications may be made without departing from the spirit of the invention.

What is claimed is:

1. A sound record comprising successive sloped rows of $n$-digit pulse position codes arranged upon a recording medium, each code being representative of an instantaneous sample amplitude of a sound to be reproduced.

2. In a system for reproducing sound, a photographic record of sounds comprising sloped rows of $n$-digit pulse code symbols representative of the instant amplitudes of a sound wave, means for converting said symbols into a sequence of electrical pulses and means responsive to said pulses to audibly reproduce said sound wave.

3. In a system for recording a sound wave photographically the combination of, means for abstracting from said wave a series of samples, means for translating said samples into an $n$-digit electronic pulse code comprising a series of pulses indicative of the instant amplitudes of said wave, means comprising a plurality of signal devices, means for energizing members of said device plurality under control of said pulse series, and photographic means for recording the operational sequence of said devices.

4. A system for recording a sound wave comprising in combination, sampling means for deriving from said wave a series of signal samples representative of the instant amplitudes of said wave, means for translating said samples into an $n$-digit pulse code representative of said samples, means for generating light beams in accordance with said pulse code, a photographic recording medium, means for moving said medium past said beams so as to image said beams thereon, and means for synchronizing the speed of said medium with the operational speed of said sampling means.

5. In a system for recording modulated electric waves the combination of, sampling means for deriving from said waves substantially instantaneous amplitude samples, means for translating said samples into an electronic pulse series representative of the amplitudes of said waves, a series of indicating devices, means for energizing individual members of said devices under control of said pulses, and means for recording photographically the operational sequence of said devices.

6. In a system for reproducing sound from a pictorially represented sound-bearing wave existing in the form of code symbols upon a photographic film the combination of, a film comprising a surface with code symbols imaged thereon, a plurality of light-sensitive devices, means for projecting said symbols in the form of light beams upon members of said device plurality, means connected to said devices for translating the impinging beams into a series of electronic pulses representative of said code symbols, sound reproducing equipment, and means for energizing said equipment under control of said pulses.

7. In a system for recording and reproducing a sound wave photographically the combination of, sampling means for deriving from said wave a series of amplitude samples, means for converting said samples into a sequence of electronic pulses symbolical of instant amplitudes of said wave, a series of indicating units, means for energizing individual members of said unit series under control of said pulses, means for recording photographically the operational sequences of said units, means for translating said photographic record into a second sequence of electronic pulses symbolical of instant amplitudes of said wave, sound reproducing means, means under control of said second pulse sequence for energizing said sound reproducing means, and means for synchronizing the speed of said sound wave reproduction with the operational speed of said sampling means.

8. In a system for recording a sound wave comprising, means for abstracting from said wave a series of samples representative of instant amplitudes of said wave, means for translating said samples into an $n$-digit electronic pulse code comprising a sequence of pulses representative of particular instant amplitudes of said wave, means for producing light beams in accordance with said pulses, and means for imaging said beams upon a photographic film.

9. In a system for recording modulated sound waves comprising, means for receiving speech-bearing waves, means for sampling continually the instant altitudes of said waves contemporaneously with their reception, means for translating said samples into an electronic pulse code representative of the varying amplitudes of said waves, means for selectively energizing members of a lamp plurality in accordance with said code, and means for recording photographically the operational sequence of said lamp plurality.

10. The system of reproducing sound from a pictorially represented sound-bearing wave existing in the form of code symbols upon a record surface comprising, means for projecting a series of light beams upon selected members of a plurality of sensitive areas in accordance with the positions of said symbols on said surface, means for originating from said members a series of electronic pulses simultaneously with the impingements of said beams, sound reproducing equipment, and means for actuating said sound reproduction equipment under control of said pulses.

11. In a system for recording and reproducing a sound wave comprising, means for abstracting from said wave a series of samples representative of instant amplitudes of said wave, means for translating said samples into an $n$-digit electronic pulse code comprising a sequence of pulses representative of said samples, means for producing light beams in accordance with said pulses, means for imaging said beams upon a photographic film, means for reproducing from said film images a second $n$-digit electronic pulse code comprising a sequence of pulses representative of said samples, sound reproduction equipment and means for utilizing said second pulse code sequence for actuation of said sound reproduction equipment to reproduce said sound wave.

12. In a system for recording sound photographically comprising, means for receiving a sound wave of varying amplitudes, means for continually analyzing said wave to obtain amplitude samples, means for generating from said samples an electronic pulse code, means for transforming said code into light flashes, means for directing said flashes upon the sensitized surface of a photographic film so that said flashes are imaged thereon, and means for reproducing from said images the code produced initially to originate said images.

13. In a system for recording a sound wave the combination of, means for abstracting from said wave a series of samples, means for translating each of said samples into an $n$-digit electronic pulse code comprising a series of pulses indicative of the instant amplitudes of said wave, means comprising a plurality of signal devices, means for energizing members of said device plurality under control of said pulse series, and means for recording the operational sequence of said devices.

14. In a system for recording a sound wave the combination of, means for abstracting from said wave a series of samples, means for translating each of said samples into an $n$-digit electronic pulse code comprising a series of pulses indicative of the instant amplitudes of said wave, means comprising a plurality of signal devices, means for selectively energizing members of said device plurality under control of said pulse series, and recording means responsive to said devices for making a reproducible sound record.

15. A system for recording a sound wave comprising in combination, sampling means for deriving from said wave a series of signal samples representative of the instant amplitudes of said wave, means for translating each of said samples into an $n$-digit pulse code representative of said samples, means for generating light beams in accordance with said pulse code, a recording medium, and means for recording said code on said medium.

RALPH K. POTTER.

REFERENCES CITED

The following references are of record in the file of this patent:

UNITED STATES PATENTS

| Number | Name | Date |
|---|---|---|
| 1,862,327 | Bagno | June 7, 1932 |
| 1,934,753 | Wildhaber | Nov. 14, 1933 |
| 1,950,011 | Scheibell | Mar. 6, 1934 |
| 2,046,328 | Kleinschmidt | July 7, 1936 |
| 2,364,210 | Guanella | Dec. 5, 1944 |
| 2,453,461 | Schelleng | Nov. 9, 1948 |